April 17, 1928.
A. UFER
ECONOMIZER
Filed Nov. 30, 1921
1,666,076
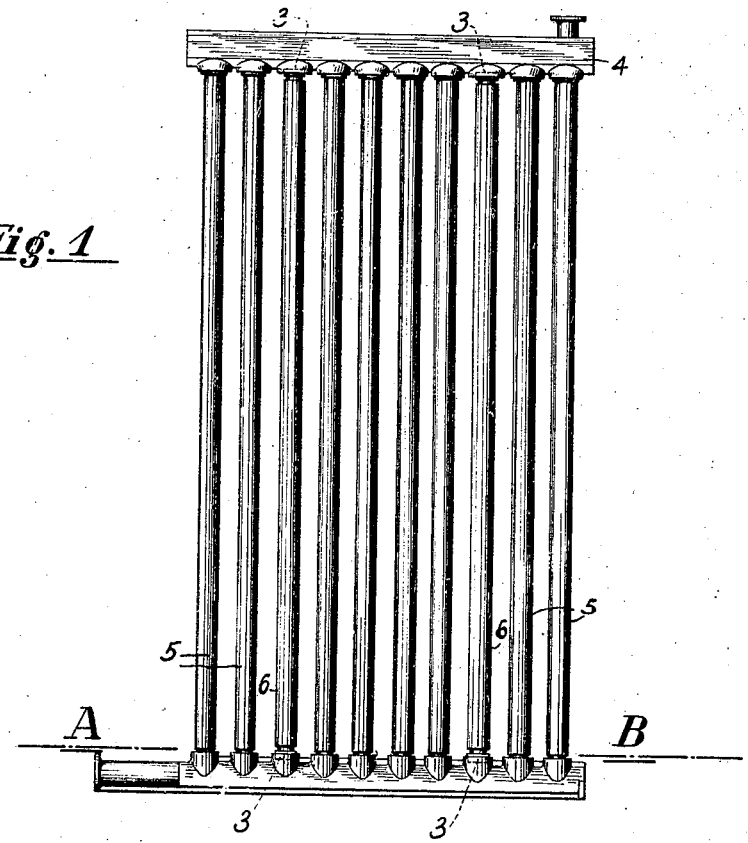
Fig. 1
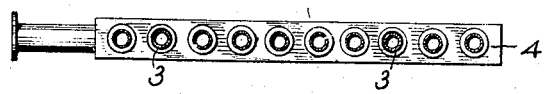
Fig. 2, A-B
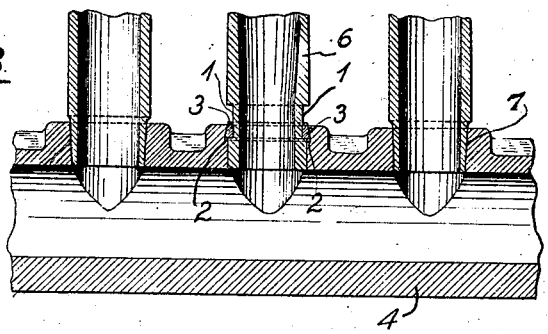
Fig. 3
Inventor Patented Apr. 17, 1928.

1,666,076

UNITED STATES PATENT OFFICE.

ALFRED UFER, OF BOCHUM, GERMANY.

ECONOMIZER.

Application filed November 30, 1921. Serial No. 518,973, and in Germany December 1, 1920.

My invention relates to improvements in fuel economizers for heating feed water for steam boilers, and more particularly in economizers of the class which consist of headers connected with each other by water tubes jointed to the headers so as to hold the same together as against internal pressure. The object of the improvements is to provide an economizer of this type in which the joints of the tubes are sufficiently strong to withstand high internal pressure. With this object in view my invention consists in fitting the tubes in holes made in the walls of the headers and securing the same in position by means of packing media embedded in chambers provided between the tubes and the walls of the bores, which chambers are provided with shoulders engaging the packing media and preventing the tubes from being withdrawn from the bores.

In order that my invention be more clearly understood an example embodying the same has been shown in the accompanying drawing, in which the same reference characters have been used in all the views to indicate corresponding parts. In said drawing,—

Fig. 1, is a side view of the economizer,

Fig. 2, is a horizontal section taken on the line 2—2 of Fig. 1 and

Fig. 3, is a vertical section on an enlarged scale showing the improved joint.

In the example shown in the figures my improved economizer consists of a pair of headers 4 communicating with each other through tubes 5 and 6. As shown the tubes 5 are formed with tapering ends 7 fitted in bores of the headers and providing tight joints. The pipes 6 are fitted in bores of the headers which as shown are cylindrical in part, and between the tube 6 and the wall of the bore a chamber is provided which preferably extends all around the tube. In the example shown in the figures the chamber is provided by an outer annular groove 1 formed on the tube 6 and an internal annular recess formed in the body of the header. Preferably the tube 6 is made with a thicker wall than the tubes 5. As shown the recess is tapered outwards, so that its outer part is reduced in diameter as compared to the inner part. The outer portion of the part of the chamber provided by the tube is reduced in diameter as compared to the inner portion. Within the chamber a suitable packing medium is confined, such for example as a ring of a suitable weldable metal made in sections and placed into the chamber and forced into the same by hammering or pressing so as to completely fill out the chamber. The tapering wall of the recess provides a shoulder which acts on the packing medium confined within the chamber, and which faces inwards and towards the end of the tube so as to secure the packing medium from being withdrawn from the chamber. The inner portion of the annular groove formed on the pipe provides a shoulder which faces outwards and to the side from which the tube is inserted into the bore of the header and therefore finds a support on the packing medium securing the tube 6 as against being withdrawn from the header.

In my improved economizer a suitable number of the tubes are provided with joints of the type shown in the tubes 6 while the remaining tubes are connected to the headers by a joint of any preferred construction such for example as shown in connection with the tubes 5. The tubes 6 have the function to hold the headers 4 together as against internal pressure, for which purpose they are provided at both ends with joints of the construction described, so that other connecting members such as rods may be dispensed with. The internal pressure causes an axial tension on the tubes 6 tending to withdraw the same from the headers. This axial tension is transmitted by the inner shoulder of the pipe to the packing medium 3 which however can not yield by reason of the tapering face of the recess of the header. It will therefore be understood that by constructing the recesses of the tube and header with walls which face respectively towards the incoming tube and away from the same a joint is produced which is adapted to withstand the highest internal pressures. The construction shown in Fig. 3 in which at least one of the said faces is tapering is preferred for the reason that the axial tension of the tube tends to force the packing medium into tight contact with the side walls of the recesses and therefore to increase the strength of the joint.

It will be observed that the seat portion of the tube 6 is of the same diameter as the external diameter of the tube body and that the groove 1 is located wholly within the line of the circumference of the tube, thus avoiding the necessity of forming the tube with external packing-engaging shoulders or beads or other circumferential projections which increase its diameter and require the formation of tube receiving openings of materially greater diameter than the tube. My invention thus allows a tube receiving opening of small size to be used, which is of greater diameter than the external diameter of the tube only for a restricted portion of its length, viz, at the base of the deepest portion of the tapered recess. The packing, therefore, when applied, lies largely within the line of the circumference of the tube. This is of importance in headers where the tubes are closely spaced and it is desirable to keep the tube receiving openings as small as possible in order to give the largest available amount of wall area between adjacent openings and thus prevent weakening of the wall of the header to such an extent as to render it liable to fracture. It will also be observed that the recess 1 is of greater length than the depth of the packing recess and projects at its outer end beyond the face of the head in which the tube opening is formed. By this means the outer end of the packing is left exposed and a clearance channel is provided for the convenient use of a tool in applying or removing the packing.

I claim:

In a header and tube connection, a header having a tube receiving opening provided with an inner cylindrical seat portion of uniform diameter throughout and an outer conical locking recess whose outer end opens through a face of the header and is of a diameter coinciding substantially with the diameter of the cylindrical seat portion and whose inner end is of greater diameter than said cylindrical seat portion, whereby an annular shoulder is formed at the intersection of the seat portion and recess, the inclined side wall of said recess tapering uniformly between said shoulder and said face of the header, a tube having an end provided with a cylindrical portion of the same diameter as the body of the tube and fitting in and having a ground joint engagement with the cylindrical seat portion of the opening in the header and formed in rear of said cylindrical portion with an annular locking groove lying wholly within the circumference of the body of the tube and presenting at its inner end an annular shoulder alining with the annular shoulder of the locking recess in the header, said groove being of greater length than the depth of the locking recess and extending beyond the said face of the header, and a wedge-shaped metallic packing compressed in said recess and groove and against said shoulders and coacting with the inclined wall of the recess to hold the seat portion of the tube into engagement with the seat portion of the opening.

In testimony whereof I affix my signature.

ALFRED UFER.